(12) United States Patent
Bond et al.

(10) Patent No.: US 6,203,606 B1
(45) Date of Patent: Mar. 20, 2001

(54) PERFORMANCE GRADE ASPHALT AND METHODS

(75) Inventors: Bruce R. Bond; Foster L. Wade, both of Houston, TX (US)

(73) Assignee: Texaco Inc., White Plains, NY (US)

( * ) Notice: Subject to any disclaimer, the term of this patent is extended or adjusted under 35 U.S.C. 154(b) by 0 days.

(21) Appl. No.: 09/196,217

(22) Filed: Nov. 20, 1998

(51) Int. Cl.$^7$ .................................................. C09D 195/00
(52) U.S. Cl. ......................... 106/278; 106/279; 106/280
(58) Field of Search .................................. 106/278, 279, 106/280

(56) References Cited

U.S. PATENT DOCUMENTS

| | | |
|---|---|---|
| 5,023,282 | 6/1991 | Neubert . |
| 5,306,419 | 4/1994 | Harrison et al. . |
| 5,385,401 | 1/1995 | Nath . |
| 5,447,628 | 9/1995 | Harrison et al. . |
| 5,639,383 * | 6/1997 | Gajas Fuentes et al. ............ 210/774 |
| 5,961,709 * | 10/1999 | Hayner et al. ....................... 106/280 |

FOREIGN PATENT DOCUMENTS

721456 * 3/1980 (SU) .

* cited by examiner

*Primary Examiner*—David Brunsman
(74) *Attorney, Agent, or Firm*—Morris N. Reinisch; Howrey Simon Arnold & White

(57) ABSTRACT

The present invention relates to Performance Grade asphalt and a method for producing the same. The process includes adding a performance grade modifier and aggregates to an asphalt cement. The performance grade modifier reduces the high temperature limit and the low temperature limit of the performance grade asphalt in a ratio of about 1:1. A vacuum distilled component of recycled used lubricating oil is used as the performance grade modifier. The recycled used lubricating oil is added to the base oil and aggregate in sufficient quantities to achieve the selected operating temperature range.

27 Claims, 2 Drawing Sheets

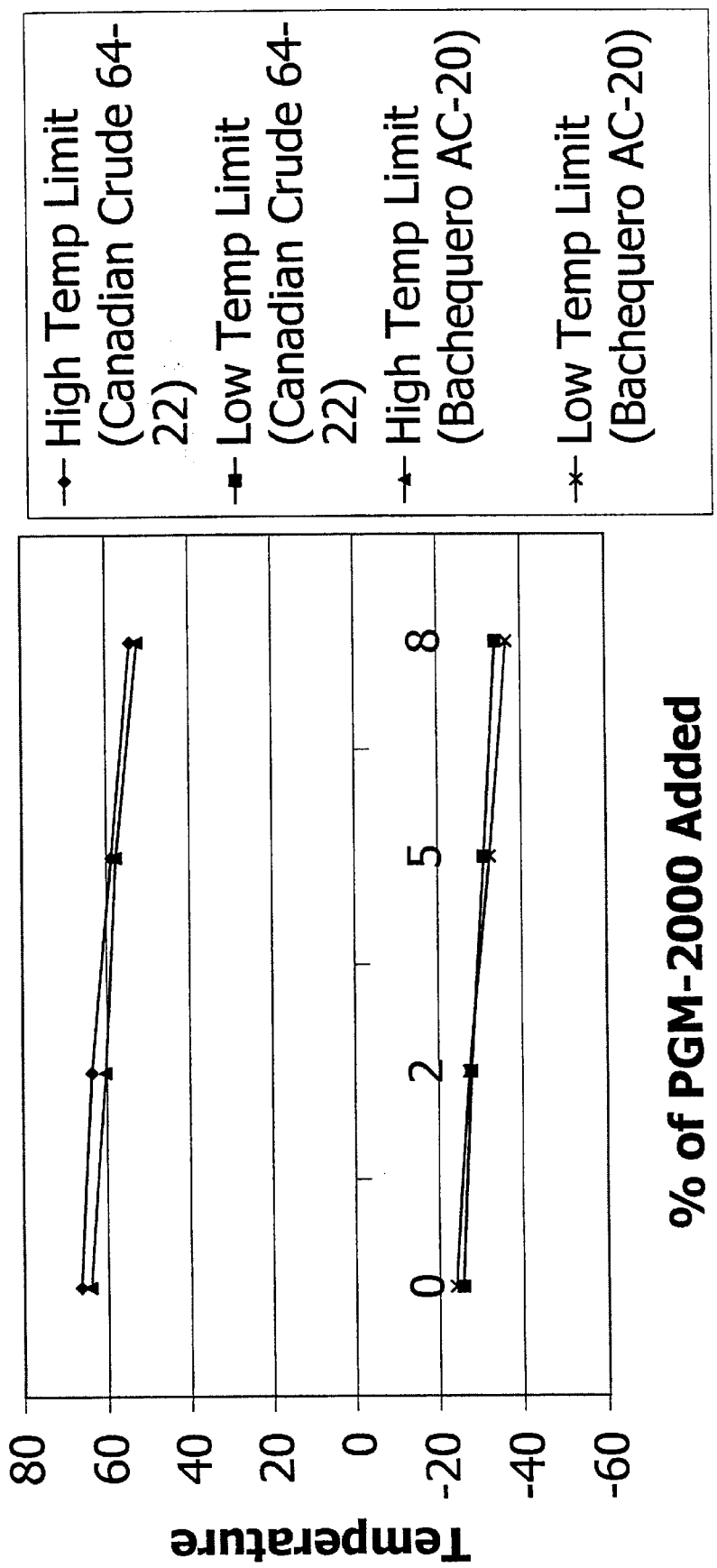
FIG. 2 – Temperature Range For Various Modifier Concentrations

PERFORMANCE GRADE ASPHALT AND METHODS

BACKGROUND OF THE INVENTION

1. Field of the Invention

The present invention relates to performance grade asphalt and more specifically to a method for making performance grade asphalt.

2. Related Art

Using asphalt for surfacing heavily traveled roads is common practice. Asphalt historically has been a mixture of heavy residual fuel oil obtained from the process of refining crude oil. Often this residual, referred to as asphalt cement and/or asphalt binder by the asphalt industry, may be the residue from the bottom of a crude vacuum tower in a typical petroleum refinery. The residual product is mixed with aggregate (stone, sand, etc.) to produce road asphalt. The mass ratio of asphalt cement to the aggregate is typically 5%. Traditionally, the critical specification of the asphalt cement was its viscosity. The higher the viscosity of the asphalt cement, the more suited the asphalt grade would be for higher ambient temperatures. Asphalt grades were categorized typically as AC-5, AC-10, AC-20, AC-30 with the higher numbers representing the higher viscosity grades, and therefore better suited for higher ambient temperatures such as would be experienced in the southern states. Other specifications which were tested included penetration, ductility, softening point and moisture susceptibility. The asphalt cement, any added modifying materials, and the aggregate are tested individually, and as a finished asphalt blended mix.

With increased use and load demand on asphalt roadways, the U.S. Department of Transportation recognized the need to modify the asphalt specifications and from 1987 through 1993 conducted the Strategic Highway Research Program (SHRP) to develop new ways to specify, test and design asphalt. The final product from SHRP is referred to as "Superpave" or Superior Performing Asphalt Pavements. For discussion purposes, this term is abbreviated as PG, or Performance Grade, asphalt. While PG asphalt testing still examines the viscosity of the asphalt cement or binder, it also analyzes the asphalt over a temperature range. PG asphalt testing artificially ages the asphalt to determine how the material can be expected to perform on the road surface during a several year period. The testing measures void spaces which can result in cracking, compacting or break up. The testing also measures heating losses which can be important when evaluating the effectiveness of asphalt modifiers from both an economic as well as an environmental standpoint. PG asphalt testing also examines and sets standards for the aggregate component of the mixture including such specifications as size (coarse vs. fine), angularity, flatness and elongation, faceted, fractured, etc.

Distinct from the former AC specifications, which graded asphalts according to viscosity, PG asphalt is categorized or graded by the temperature range over which the particular grade will meet or exceed the minimum required specifications. For example, a typical PG grade of asphalt is PG 64-22. This indicates that the asphalt will meet specification throughout a temperature operating range of 64 degrees C. (147 degrees F.) down to −22 degrees C.(7.6 degrees F.). PG asphalt temperature specifications vary in 6 degree increments. For example, the next lower temperature grade below −22 degrees C. is −28 degrees C. The next higher grade above 64 degrees C. is 70 degrees C. Generally speaking if there is less than 90 degrees C. between the upper and lower temperatures in a PG asphalt grade, that grade can more than likely be produced without the need to add performance improving components or modifiers. However, if a specification requires more than 90 degrees C. between the upper and lower temperatures, such as PG 64-28 or PG 58-34, generally either high-end or low-end modifiers are required. The demand for wide range PG asphalt is greater in the northern latitudes as the ambient temperature range is greater there than in the southern areas.

An ideal asphalt is stiff enough to resist compacting or rutting from heavy highway loads during high ambient temperatures, while having a high enough tensile strength to not be brittle under those same heavy loads during very low ambient temperatures. The differential in low ambient temperatures is greater than the differential in the high ambient temperatures between the northern and southern latitudes. Therefore, the ability to drop the lower end of the PG range is more critical than raising the upper end of the range.

Conventionally, the low end of the range is modified through the addition of a petroleum distillate. Initially, asphalt blenders utilized diesel fuel or home heating oil to drop the low end of the performance range. Typical petroleum distillate blended into asphalt cement lowers the upper temperature about two degrees for every one degree that is reduced at the low end of the temperature range. Thus, conventional petroleum distillate reduces the high temperature limit and the low temperature limit of the asphalt cement in a ratio of about 2:1. In order to maintain the upper temperature range when using such conventional distillate fuel oil to lower the low end of the temperature range, it is necessary to add polymer concentrate to counteract the effects that the fuel oil has on the upper end of the temperature range. These polymer concentrates add considerable expense to the overall cost of the asphalt.

Thus, there is a need in the art for an inexpensive performance grade asphalt. Particularly, there is a need in the art for a method of making an inexpensive performance grade asphalt that is effective over a wide temperature range. Still more particularly, there is a need for a method of making Performance Grade asphalt that improves the high to low temperature limit ratio to less than about 2:1.

SUMMARY OF THE INVENTION

The present invention solves the problems with, and overcomes the disadvantages of conventional performance grade asphalt and the methods for producing the same. The present invention relates to performance grade asphalt and, more specifically, to methods for producing performance grade asphalt.

In the present invention, the performance grade asphalt comprises an asphalt cement, aggregates and recycled used lubricating oil. The recycled used lubricating oil reduces the high temperature limit and the low temperature limit of the Performance Grade asphalt in a ratio of about 1:1.

A process for making performance grade asphalt is disclosed. The process includes blending a performance grade modifier with the asphalt cement prior to the mixture with the aggregate. The performance grade modifier is a vacuum distilled component of recycled used lubricating oil. The PG modifier reduces the high temperature limit and the low temperature limit of the performance grade asphalt in a ratio of about 1:1. The PG modifier oil is added to the asphalt cement and aggregate in sufficient quantities to achieve a selected operating temperature range.

Accordingly, the present invention provides a performance grade asphalt which is adaptable to a variety of environments and is effective over a wide range of temperatures. The present invention further provides a method for producing such a performance grade asphalt.

Features and Advantages

By using recycled used oil as a PG modifier, the oil is not hydrotreated, and therefore, the end product is less expensive than modifiers comprising pure, hydrotreated base oils. Additionally, the use of the recycled used oil is environmentally sound by effectively utilizing what is typically a waste product.

Using hydrotreated base oils and lubricants as a PG modifier essentially results in those products being downgraded into asphalt with an accompanying loss in value. Using the recycled used lubricating oil as a PG modifier results in the product being upgraded from a fuel/feedstock market into asphalt with an improvement in value.

Furthermore, since the method of the present invention allows the low end of the temperature range to be lowered with little or no consequential effect on the upper end of the temperature range, polymers are not required as an additional modifier and the cost of the resulting Performance Grade asphalt is significantly less than conventional PG asphalts.

Additional features and advantages of the invention will be set forth in the description that follows, and in part will be apparent from the description, or may be learned in practice of the invention.

BRIEF DESCRIPTION OF THE DRAWINGS

The accompanying drawings, which are incorporated in and constitute a part of this specification, illustrate embodiments of the invention and, together with the description, serve to explain the features, advantages, and principles of the invention.

FIG. 1 shows results using two types of Performance Grade modifiers and two types of base crude oil.

FIG. 2 is a graph of temperature range for various Performance Grade modifier concentrations. FIG. 2 shows a graph of temperature for Performance Grade asphalt as a function of concentration of Performance Grade modifier according to the present invention.

DETAILED DESCRIPTION OF THE PREFERRED EMBODIMENTS

Figure 1:
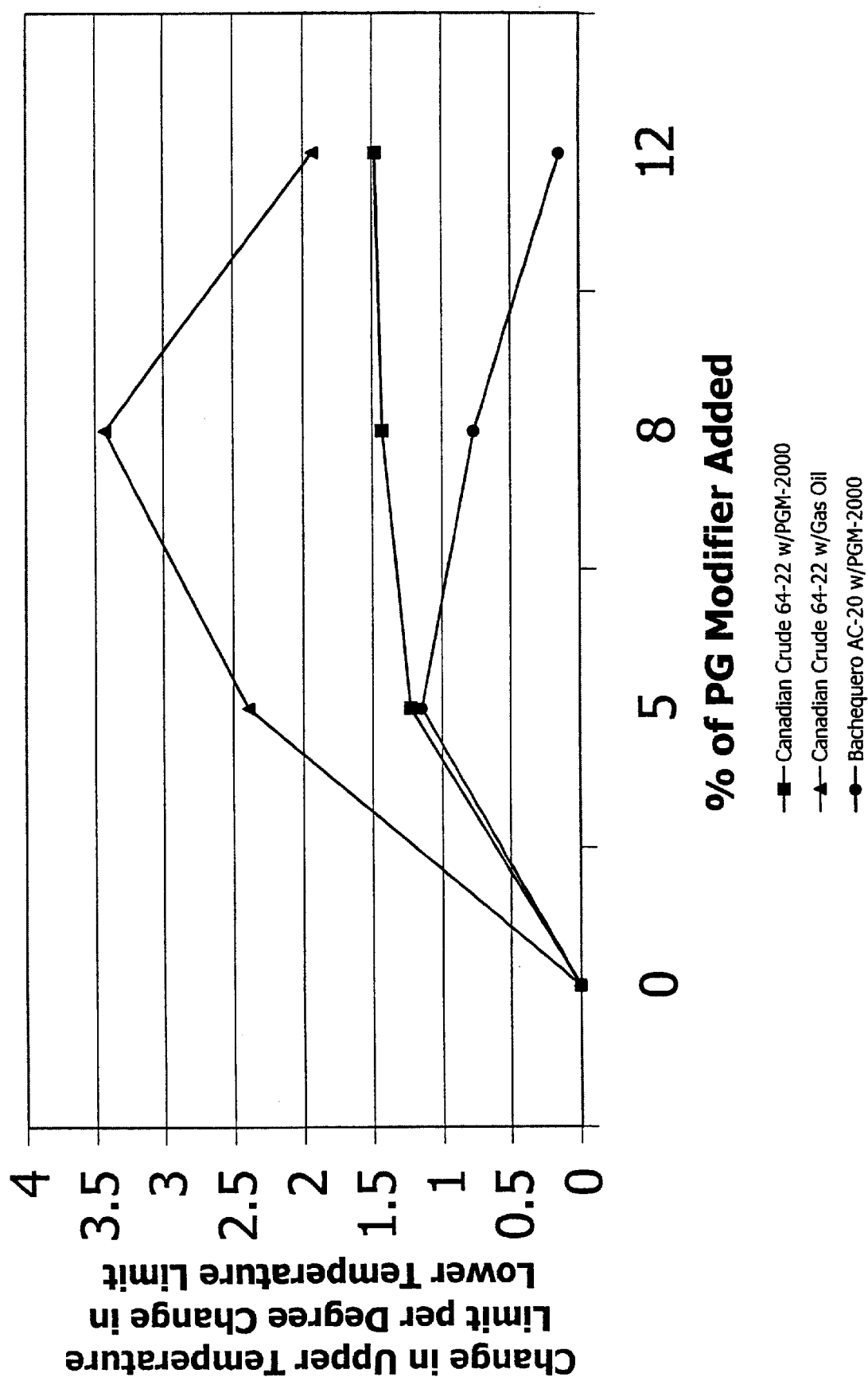
FIG. 1 is a graph of the degrees of high temperature drop per degree of low temperature drop as a function of the percentage of Performance Grade modifier added.

Reference will now be made in detail to the present preferred embodiments of the invention. The exemplary embodiment of this invention is discussed in some detail, although it will be apparent to those skilled in the relevant art that some features which are not relevant to the invention may not be discussed.

The Performance Grade (PG) asphalt of the present invention is effective across a wide range of temperatures. In order to reduce the lower temperature limit at which the asphalt is effective, a Performance Grade modifier is added to a base crude oil, also known in the art as asphalt cement, and aggregate mixture. As used herein, the term "base crude oil" or "asphalt cement" refers to any of a variety of solid or semi-solid materials at room temperature which gradually liquefy when heated and in which the predominant constituents are bitumens which are obtained as residue in petroleum refining. As used herein, the term "aggregate" refers to the additional materials such as sand, rocks, etc. which are added to the asphalt cement to reduce the viscosity of the asphalt composition.

An ideal PG modifier would be one which lowers the low end of the temperature range while raising the upper end of the temperature range. It has been found that adding a high viscosity base oil or finished lubricant to the asphalt will decrease the lower end and upper end of the temperature range in about a one to one ratio. These modifiers, although not ideal, eliminate or significantly reduce the need to add polymers. This is due primarily to the fact that lubricants already contain polymeric compounds. These high viscosity base oils and finished lubricants are typically hydrotreated during their manufacture in order to purify them for use as lubricants. The hydrotreating process is extremely costly and requires a great deal of specialized equipment.

The Performance Grade modifier of the present invention reduces the lower temperature limit of the operating temperature range of the asphalt. While the high temperature limit is also reduced, the reduction of the high and low temperature limits is in a ratio of about 1:1. Such a result is desirable so that the wide range is achieved while being able to meet lower operating temperature requirements.

The present invention utilizes a Performance Grade modifier that is a recycled used lubricating oil. A preferred recycled used lubricating oil is known commercially as HVGO/PGM-2000 (PGM-2000) produced at the TFAMM Used Oil Recycling Plant in Marrero, Louisiana. A process for recycling or reclaiming such a used lubricating oil is described in U.S. Pat. Nos. 5,306,419 and 5,447,628, assigned to the assignee of the present invention, the entirety of both of which are incorporated herein by reference. No hydrotreating is required to prepare the recycled used oil for use in the PG asphalt since it will not be used as a lubricant, but as a modifier for asphalt. Because the PGM-2000 has not been hydrotreated, its cost is considerably less than lubricant base oil of similar viscosity. In a preferred embodiment of the present invention, the Performance Grade modifier is used lubricating oil that has been reclaimed to produce a metal-free distillate oil.

The recycled used lubricating oil of the present invention has several characteristics that make it a desirable PG modifier. It is not desirable for modifiers to have an Initial Boiling Point (IBP), the beginning of a compound's distillation range, below the temperature at which the asphalt cement is stored, transported and/or mixed as some portion of the lighter material will vaporize resulting in product loss and potential environmental problems. Therefore, the higher the IBP of an asphalt modifier, the more desirable. Higher viscosity lubricant base oils and finished lubricant products have fairly high IBP's as does the PGM-2000 relative to normal distillate fuel oils. The IBP's of these products are generally around 500 degrees Fahrenheit compared to typical distillate fuel oils used as asphalt modifiers which have IBP's in the 300–400 degree F. range. Additionally, the distillation range of any asphalt modifier or blend component is important as the asphalt mix is generally quite hot due to the high viscosities and pour points of the asphalt cements which require the mix to be stored and transported at a high temperature for reasons of fluidity.

In one embodiment, the recycled used lubricating oil is prepared by first heating used lubricating oil to an additive decomposition temperature of about 400 degrees F. to about 1000 degrees F. The lubricating oil is maintained at the additive decomposition temperature for a residence time in the range of 10 to 120 minutes. The heated recycled used lubricating oil is then vacuum distilled at a distillation temperature of about 400 degrees Fahrenheit to about 1050 degrees Fahrenheit and a distillation pressure of about 20 to 500 mm Hg. The recycled used lubricating oil is then recovered as a distillate product.

The recycled used lubricating oil is added to the base crude oil, or asphalt cement, and aggregates in quantities sufficient to achieve the selected operating temperature range. The mass ratio of asphalt cement to the aggregate is typically 5% to 95%. Within specific PG asphalt grade ranges, the asphalt cement and modifiers, if any, and aggregates are mixed into trial blends and then batched and compacted in a Superpave gyratory compactor. The compacted samples are then tested according to particular design criteria which will vary from contract to contract and state to state based on specification requirements. Typically, compacted samples will be tested for Air Void Content, Voids in the Mineral Aggregate, Resistance to Compaction (Rutting—a high temperature issue) and Tensile Strength (Brittleness—a low temperature issue).

To more clearly describe the system, the following example is given. It is to be understood that the details and calculations shown below are simplified to describe the primary factors involved in calculating the temperature range of the PG asphalt. As would be apparent to one of ordinary skill in the art, other secondary factors may affect the calculations and results. This example should not represent any limitation on the present invention. Corresponding reference numerals will be used where appropriate.

The Performance Grade asphalt described above has been produced and tested. The results achieved using various base crude oils and a range of modifier concentrations are shown in Table 1 below. The modifier used in the example was the PGM-2000 recycled used lubricating oil described above.

Furthermore, FIG. 1 graphically depicts the results of the change in the high temperature limit per degree of change in low temperature limit for the various concentrations of base oil and PGM-2000. The results of the high and low temperature limits for the various concentrations of base oil and PGM-2000 are graphically depicted in FIG. 2.

TABLE 1

| Base Crude Oil | % of PGM-2000 added | High Temperature Limit | Low Temperature Limit | Change in High limit:Change in low limit |
|---|---|---|---|---|
| Canadian Crude 64-22 | 0 | 66.4 | −25.6 | 0 |
| Canadian Crude 64-22 | 2 | 63.7 | −27.8 | 1.23 |
| Canadian Crude 64-22 | 5 | 58.8 | −30.9 | 1.43 |
| Canadian Crude 64-22 | 8 | 54.1 | −33.9 | 1.48 |
| Bachequero AC-20 | 0 | 64.1 | −24 | 0 |
| Bachequero AC-20 | 2 | 60.3 | −27.3 | 1.15 |
| Bachequero AC-20 | 5 | 57.7 | −32.3 | 0.77 |
| Bachequero AC-20 | 8 | 52.3 | −36.5 | 0.14 |

As described above, and as shown in the above table, the present invention provides a Performance Grade asphalt which is adaptable to a variety of environments and is effective over a wide range of temperatures, whereby the decrease in the upper and lower limits of the temperature range occurs in a ratio less than about 2:1, in about a 1:1 ratio. The present invention further provides a method for producing such a performance grade asphalt. It should be apparent that the present invention may be used to increase efficiency, to lower production costs, and to simplify the production of Performance Grade asphalt.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. A process for making performance grade asphalt, comprising:
   blending a performance grade modifier and aggregates with an asphalt cement, wherein the performance grade modifier is a vacuum distilled component of recycled used lubricating oil, and the performance grade modifier modifies a high temperature limit and a low temperature limit of the performance grade asphalt; and
   selecting a desired operating temperature range, wherein the performance grade modifier is added to the blend in quantities sufficient to achieve said selected operating temperature range.

2. The process of claim 1, wherein the performance grade modifier is blended with the asphalt cement prior to the mixture with the aggregate.

3. The process of claim 1, wherein the performance grade modifier has an initial boiling point of about 500 degrees Fahrenheit.

4. The process of claim 1, wherein the performance grade modifier reduces a high temperature limit and a low temperature limit of the performance grade asphalt in a ratio of less than about 2:1.

5. The process of claim 4, wherein the ratio is about 1:1.

6. The process of claim 1, wherein the recycled used lubricating oil is prepared using a recycling process comprising:
   heating used lubricating oil to an additive decomposition temperature of about 400 degrees Fahrenheit to about 1000 degrees Fahrenheit; and
   maintaining the used lubricating oil at the additive decomposition temperature for a residence time in the range of 10 to 120 minutes.

7. The process of claim 6, wherein the recycling process further comprises:
   vacuum distilling the heated recycled used lubricating oil at a distillation temperature of about 400 degrees Fahrenheit to about 1050 degrees Fahrenheit and a distillation pressure of about 20 to 500 mm Hg; and
   recovering the recycled used lubricating oil as a distillate product.

8. Performance Grade asphalt comprising:
   an asphalt cement;
   aggregates; and
   recycled used lubricating oil that is substantially free of metals.

9. The Performance Grade asphalt of claim 8, wherein the recycled used lubricating oil reduces a high temperature limit and a low temperature limit of the Performance Grade asphalt in a ratio of less than about 2:1.

10. The Performance Grade asphalt of claim 9, wherein the ratio is about 1:1.

11. The Performance Grade asphalt of claim 8, wherein the recycled used lubricating oil has an initial boiling point of about 500 degrees Fahrenheit.

12. A process for making performance grade asphalt, comprising:
   blending a performance grade modifier and aggregates with an asphalt cement, wherein the performance grade modifier is a vacuum distilled component of recycled used lubricating oil that is substantially free of metals.

13. The process of claim 12, wherein the performance grade modifier is blended with the asphalt cement prior to the mixture with the aggregate.

14. The process of claim 12, wherein the performance grade modifier has an initial boiling point of about 500 degrees Fahrenheit.

15. The process of claim 12, wherein the performance grade modifier reduces a high temperature limit and a low temperature limit of the performance grade asphalt in a ratio of less than about 2:1.

16. The process of claim 15, wherein the ratio is about 1:1.

17. The process of claim 12, wherein the recycled used lubricating oil is prepared using a recycling process comprising:

heating used lubricating oil to an additive decomposition temperature of about 400 degrees Fahrenheit to about 1000 degrees Fahrenheit; and maintaining the used lubricating oil at the additive decomposition temperature for a residence time in the range of 10 to 120 minutes.

18. The process of claim 17, wherein the recycling process further comprises:

vacuum distilling the heated recycled used lubricating oil at a distillation temperature of about 400 degrees Fahrenheit to about 1050 degrees Fahrenheit and a distillation pressure of about 20 to 500 mm Hg; and recovering the recycled used lubricating oil as a distillate product.

19. The process of claim 12, further comprising:

selecting a desired operating temperature range, and wherein Performance Grade modifier is added to the base crude oil in quantities sufficient to achieve said selected operating temperature range.

20. A Performance Grade asphalt prepared by the process comprising:

adding a performance grade modifier and aggregates to an asphalt cement, wherein the performance grade modifier is a vacuum distilled component of recycled used lubricating oil that is substantially free of metals.

21. The performance grade asphalt of claim 20, wherein the performance grade modifier is blended with the asphalt cement prior to the mixture with the aggregate.

22. The Performance Grade asphalt of claim 20, wherein the performance grade modifier has an initial boiling point of about 500 degrees Fahrenheit.

23. The Performance Grade asphalt of claim 20, wherein the performance grade modifier reduces a high temperature limit and a low temperature limit of the performance grade asphalt in a ratio of less than about 2:1.

24. The Performance Grade asphalt of claim 23, wherein the ratio is about 1:1.

25. The Performance Grade asphalt of claim 24, wherein the recycled used lubricating oil is prepared using a recycling process comprising:

heating used lubricating oil to an additive decomposition temperature of about 400 degrees Fahrenheit to about 1000 degrees Fahrenheit; and maintaining the used lubricating oil at the additive decomposition temperature for a residence time in the range of 10 to 120 minutes.

26. The Performance Grade asphalt of claim 25, wherein the recycling process further comprises:

vacuum distilling the heated recycled used lubricating oil at a distillation temperature of about 400 degrees Fahrenheit to about 1050 degrees Fahrenheit and a distillation pressure of about 20 to 500 mm Hg; and recovering the recycled used lubricating oil as a distillate product.

27. The Performance Grade asphalt of claim 20, wherein a desired operating temperature range is selected, and Performance Grade modifier is added to the base crude oil in quantities sufficient to achieve said selected operating temperature range.

* * * * *